(12) United States Patent
Ramdane et al.

(10) Patent No.: US 9,800,108 B2
(45) Date of Patent: Oct. 24, 2017

(54) PERMANENT MAGNET ROTOR SHAFT ASSEMBLY AND METHOD

(71) Applicants: Lateb Ramdane, Val de Reuil (FR); Joaquim Da Silva, Sennely (FR)

(72) Inventors: Lateb Ramdane, Val de Reuil (FR); Joaquim Da Silva, Sennely (FR)

(73) Assignee: SKF MAGNETIC MECHATRONICS, Saint-Marcel (FR)

( * ) Notice: Subject to any disclaimer, the term of this patent is extended or adjusted under 35 U.S.C. 154(b) by 369 days.

(21) Appl. No.: 14/500,454

(22) Filed: Sep. 29, 2014

(65) Prior Publication Data
US 2015/0084464 A1 Mar. 26, 2015

(30) Foreign Application Priority Data
Sep. 26, 2013 (EP) .................................... 13306322

(51) Int. Cl.
*H02K 1/27* (2006.01)
*H02K 15/03* (2006.01)
*H02K 7/09* (2006.01)
*H02K 1/02* (2006.01)
*H02K 7/08* (2006.01)
*H02K 1/28* (2006.01)
*F16C 32/04* (2006.01)

(52) U.S. Cl.
CPC ............ *H02K 1/28* (2013.01); *H02K 1/2726* (2013.01); *F16C 32/0468* (2013.01); *Y10T 29/49012* (2015.01)

(58) Field of Classification Search
CPC .... F16C 32/0468; H02K 1/2726; H02K 1/28; Y10T 29/49012

USPC .................. 310/90.5, 156.11, 90, 156.22
See application file for complete search history.

(56) References Cited

U.S. PATENT DOCUMENTS

| 3,112,417 | A |   | 11/1963 | Tamm |             |
|-----------|---|---|---------|--------|-------------|
| 4,433,261 | A | * | 2/1984  | Nashiki | H02K 1/278 |
|           |   |   |         |        | 310/156.28  |
| 4,617,726 | A |   | 10/1986 | Denk |             |
| 4,741,094 | A |   | 5/1988  | Denk et al. |      |
| 5,121,020 | A | * | 6/1992  | Bertram | H02K 1/2726 |
|           |   |   |         |        | 310/156.11  |

(Continued)

FOREIGN PATENT DOCUMENTS

| DE | 1938162 U | 4/1968 | |
| EP | 0223612 A1 * | 5/1987 | ........... H02K 1/2753 |

(Continued)

*Primary Examiner* — Alex W Mok
(74) *Attorney, Agent, or Firm* — Bryan Peckjian; SKF USA Inc. Patent Dept.

(57) ABSTRACT

A permanent magnet rotor shaft assembly for a high speed electrical machine provides a permanent magnet cylindrical core having a longitudinal axis, the cylindrical core being axially compressed by first and second end shafts and being radially compressed by a sleeve made of a non-magnetic high strength metal. At least one of the first and second end shafts includes, facing the cylindrical core, a central shoulder head that cooperates with a mating central recess made in a central portion of a front face of the cylindrical core. An easy concentric alignment of the first and second end shafts with the permanent magnet cylindrical core is allowed while inserting the sleeve and the stiffness of the assembled set is enhanced.

15 Claims, 1 Drawing Sheet

(56) References Cited

U.S. PATENT DOCUMENTS

| | | | |
|---|---|---|---|
| 5,936,324 A * | 8/1999 | Montagu | H02K 1/2726 |
| | | | 310/156.11 |
| 6,104,115 A | 8/2000 | Offringa et al. | |
| 7,042,118 B2 | 5/2006 | McMullen et al. | |
| 2004/0189126 A1 | 9/2004 | Brunet et al. | |
| 2005/0062353 A1* | 3/2005 | Brown | H02K 1/2726 |
| | | | 310/156.11 |
| 2011/0304234 A1* | 12/2011 | Ramon | H02K 5/1672 |
| | | | 310/156.21 |
| 2014/0175929 A1* | 6/2014 | Horng | H02K 1/28 |
| | | | 310/156.08 |

FOREIGN PATENT DOCUMENTS

| | | | | |
|---|---|---|---|---|
| NL | EP 0332269 A2 * | 9/1989 | | H02K 1/2726 |
| WO | 9834324 A1 | 8/1998 | | |

\* cited by examiner

PERMANENT MAGNET ROTOR SHAFT ASSEMBLY AND METHOD

CROSS-REFERENCE TO RELATED APPLICATIONS

This application claims priority to European Patent Application EP13306322 filed Sep. 26, 2013, the contents of which are herein fully incorporated by reference.

FIELD OF THE INVENTION

The present invention relates to a permanent magnet rotor shaft assembly for high speed electrical machines and a method of manufacture thereof.

DESCRIPTION OF THE RELATED ART

An example of a known method for fabricating a permanent magnet rotor for an electrical machine is disclosed in U.S. Pat. No. 6,104,115 A. According to this method, permanent magnets are provided on a sleeve having a constant outer diameter whereas the inside of the sleeve is conical. A screen made essentially of a highly conducting material is then provided on the surface of the permanent magnets facing a stator of the electrical machine. An annular fiber reinforced support is fitted on the screen. The conical shape of the outside of an inner rotor support is complementary to the conical shape of the inside of the sleeve. Such a manufacturing process is not cost effective and the manufacturing and assembly time is not in accordance with serial production.

U.S. Pat. No. 4,741,094 A and document WO 98/34324 A1 disclose a method of making a two-pole magnet rotor for an electrical machine, comprising the steps of forming a cylindrical two-pole permanent magnet from either small blocks aligned with the same axis of magnetic polarity assembled in a solid overlaying relationship or a whole cylindrical block (WO 98/34324 A1); bonding a first end piece onto one end of the cylindrical two-pole permanent magnet; bonding a second end piece onto the other end of the cylindrical two-pole permanent magnet; and installing a thin cylindrical retaining hoop in interference fit fashion around the cylindrical two-pole permanent magnet and the portions of the first and second end pieces adjacent to the cylindrical two-pole permanent magnet. This method of manufacturing an assembly with two end shafts, a magnet cylinder made of a plurality of magnets assembled as a core, this core being axially compressed by end shafts and the set being radially compressed and fixed by a high tensile sleeve, is rather cost effective and is in line for serial production. However such a method remains difficult to put into practice in particular because it is difficult to insure a concentric alignment while inserting the sleeve.

U.S. Pat. No. 7,042,118 B2 further discloses a rotor construction method aiming at improving the concentric alignment when inserting a sleeve. According to such a method a plurality of hollow magnet discs are provided and a tie rod is placed in the central bores of the hollow magnet discs and fixed to end shafts. Such a method is not cost effective and the use of hollow magnet discs might be detrimental to the stiffness and efficiency of the assembly.

SUMMARY OF THE INVENTION

The technical problem to be solved is to provide a permanent magnet rotor shaft assembly for high speed electrical machines and a method of manufacture thereof which remedy the above-mentioned drawbacks.

More specifically the invention aims at improving the easiness of a manufacturing process with a reduced number of pieces arranged on a shaft.

The invention further aims at allowing the possibility of creating a rotor assembly providing a high stiffness permanent rotor shaft.

Another aim of the present invention is to have a simplified manufacturing process, enabling a lower cost and a high serial manufacturing process.

The invention is defined in the appended claims.

The invention more specifically relates to a permanent rotor shaft assembly for an electrical machine, comprising a permanent magnet cylindrical core having a longitudinal axis, the cylindrical core being axially compressed by first and second end shafts and being radially compressed by a sleeve made of a non-magnetic high strength metal, characterized in that at least one of the first and second end shafts comprises, in its portion facing the cylindrical core, a central shoulder head which cooperates with a mating central recess made in a central portion of a front face of the cylindrical core.

The permanent magnet cylindrical core may comprise rare earth magnets which may be made of NdFeBr or Sm2Co17 for example.

The sleeve may be made of a non-magnetic high strength metal such as Inconel, HasteHoy, Ti-6% Al-6% V-2% Sn, Ti-2.5% Cu.

The central shoulder head may be inserted in the mating central recess by tight fit assembly, slip joint assembly or glued assembly.

The first and second end shafts and the sleeve may be fixed on the permanent magnet cylindrical core by welding, adhesive or heat shrinking.

According to a specific embodiment, the first and second end shafts further comprise cylindrical tracks for mechanical bearings.

Such cylindrical tracks for mechanical bearings may be located on a stepped portion of the first and second end shafts.

Alternatively or in addition the first and second end shafts may further comprise cylindrical stack iron laminations for magnetic bearings.

Such cylindrical stack iron laminations for magnetic bearings may be located on a stepped portion of the first and second end shafts.

Preferably, in the permanent rotor shaft assembly according to the invention, a central shoulder head is provided in each of the first and second end shafts, in its portion facing the cylindrical core, a mating central recess is provided in each of the central portions of the front faces of the cylindrical core, and the central shoulder heads are respectively mounted in the mating central recesses.

The permanent magnet cylindrical core may form a two-pole permanent magnet or a four-pole permanent magnet.

The invention further relates to a rotary high speed electrical machine having tip speeds up to 300 m/s, characterized in that it comprises a permanent rotor shaft assembly as defined above.

The invention further relates to a method for making a permanent rotor shaft assembly for an electrical machine, comprising the steps of:

forming a permanent magnet cylindrical core having a longitudinal axis, bonding a first end shaft onto one end of the permanent magnet cylindrical core, bonding a second end shaft onto the other end of the permanent magnet cylindrical core, installing a sleeve made of a non-magnetic high strength metal in interference fit fashion around the permanent magnet cylindrical core and the portions of the first and second end shafts adjacent to the permanent magnet cylindrical core, so that the cylindrical core be axially compressed by the first and second end shafts and be radially compressed by the sleeve, characterized in that it further comprises the steps of:

providing at least one central shoulder head in the first and second end shafts, in its portion facing the cylindrical core, providing in a central portion of a front face of the cylindrical core, at least one mating central recess, which is adapted to cooperate with the at least one central shoulder head, and mounting the at least one central shoulder head in the at least one mating central recess, before inserting the sleeve made of a non-magnetic high strength metal in interference fit fashion around the permanent magnet cylindrical core and the portions of the first and second end shafts adjacent to the permanent magnet cylindrical core.

According to a preferred embodiment, a central shoulder head is provided in each of the first and second end shafts, in its portion facing the cylindrical core, a mating central recess is provided in each of the central portions of the front faces of the cylindrical core, and the central shoulder heads are respectively mounted in the mating central recesses, before inserting the sleeve made of a non-magnetic high strength metal in interference fit fashion around the permanent magnet cylindrical core and the portions of the first and second end shafts adjacent to the permanent magnet cylindrical core.

The central shoulder head may be inserted in a mating central recess by tight fit assembly, slip joint assembly or glued assembly.

The first and second end shafts and the sleeve may be fixed to the permanent magnet cylindrical core by welding, adhesive or heat shrinking.

Due to the provision of central shoulder heads and corresponding mating central recesses, the invention more specifically allows an easy concentric alignment of the first and second end shafts with the permanent magnet cylindrical core while inserting the sleeve. Moreover it increases the stiffness on the set once assembled.

DESCRIPTION OF THE PREFERRED EMBODIMENTS

The present invention will be described in connection with preferred embodiments which are given by way of examples.

Figure 1:
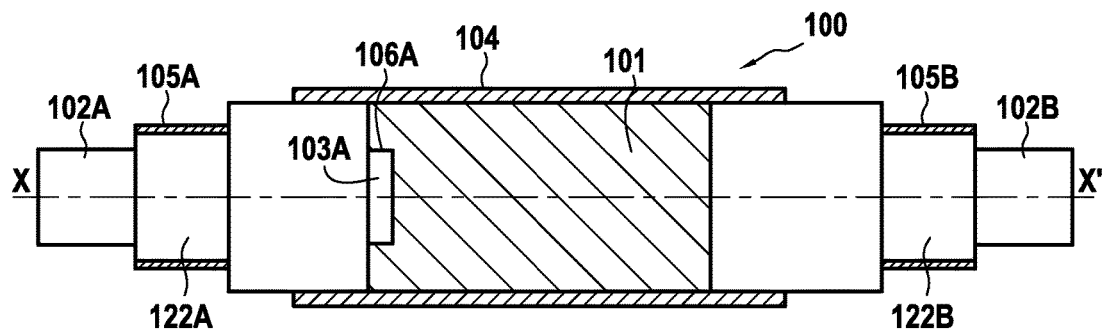
FIG. 1 is a schematic longitudinal section of a permanent magnet rotor shaft assembly for a high speed electrical machine according to a first embodiment of the invention.

A typical arrangement of a first embodiment of the invention is illustrated in FIG. 1 which shows a permanent rotor shaft assembly 100 for an electrical machine, more specifically for high speed applications which can reach tip speeds up to 300 m/s. The assembly 100 comprises a permanent magnet cylindrical core 101 having a longitudinal axis X-X'. The cylindrical core 101 is axially compressed by first and second end shafts 102A, 102B and is radially compressed by a sleeve 104 made of a non-magnetic high strength metal. The set of elements 101, 102A and 102B forms the overall rotor shaft.

According to the invention one (102A) of the first and second end shafts 102A, 102B comprises, in its portion facing the cylindrical core 101, a central shoulder head 103A which cooperates with a mating central recess 106A made in a central portion of a front face of the cylindrical core 101.

The shoulder head 103A insures the concentricity of the elements 101 and 102A during the assembly process and provides support for the cylindrical magnet core 101, whilst introducing additional stiffness to the set of assembled elements 101, 102A and 102B once the mounting process is achieved.

The permanent magnet cylindrical core 101 comprises rare earth magnets such as NdFeBr or Sm2Co17.

The sleeve 104 is made of a non-magnetic high strength metal which may be advantageously chosen among Inconel, Hastelloy, Ti-6% Al-6% V-2% Sn, Ti-2.5% Cu.

The magnetization direction of the magnet 101 may be radial, diametral or constituted by a Halbach magnetization.

The polarity of the magnets of the core 101 can be 2 poles or 4 poles.

The central shoulder head 103A is inserted in the mating central recess by tight fit assembly, slip joint assembly or glued assembly.

The first and second end shafts 102A, 102B and the sleeve 104 are fixed on the permanent magnet cylindrical core 101 by welding, adhesive or heat shrinking.

The sleeve 104 constitutes a hoop which radially compresses the permanent magnet cylindrical core 101 and the first and second end shafts 102A, 102B.

The first and second end shafts 102A, 102B axially compress the permanent magnet cylindrical core 101.

According to a specific embodiment, the first and second end shafts 102A, 102B further comprise cylindrical tracks 105A, 105B for mechanical bearings.

The reference numerals 105A, 105B may also alternatively represent cylindrical stack iron laminations for magnetic bearings. Such cylindrical stack iron laminations may be made on the first and second end shafts 102A, 102B as an alternative for cylindrical tracks for mechanical bearings, but the first and second end shafts 102A, 102B may also comprise simultaneously in a not shown embodiment a combination of both cylindrical tracks for mechanical bearings (such as auxiliary bearings associated with magnetic bearings) and cylindrical stack iron laminations for magnetic bearings.

The tracks for mechanical bearings and/or the stack iron laminations for magnetic bearings may be located on a stepped portion 122A, 122B of the first and second end shafts 102A, 102B. Actually the elements 105A, 105B may be located at different levels (different area or different shoulder) of the end shafts according to the needs.

Figure 2:
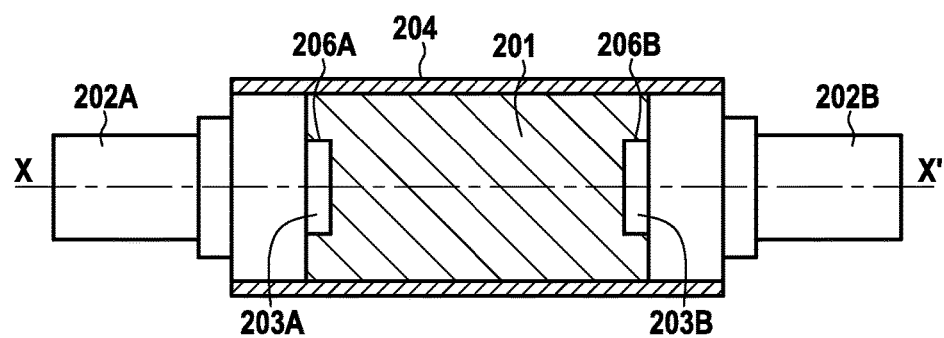
FIG. 2 is a schematic longitudinal section of a permanent magnet rotor shaft assembly for a high speed electrical machine according to a second embodiment of the invention.
Figure 3:
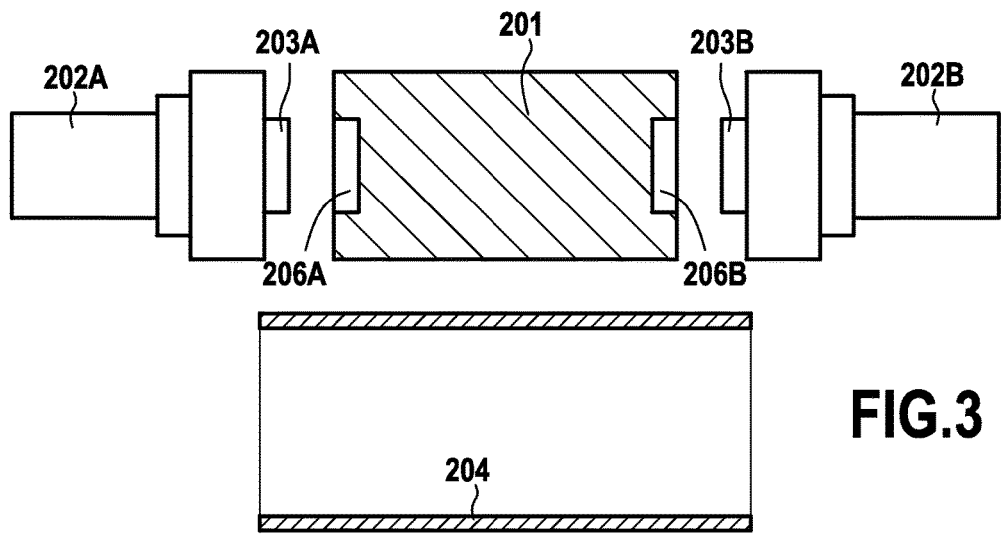
FIG. 3 is a schematic exploded view of the permanent magnet rotor shaft assembly of FIG. 2.

FIGS. 2 and 3 illustrate a second embodiment of the invention which relates to a permanent rotor shaft assembly 200 for an electrical machine, more specifically for high speed applications which can reach tip speeds up to 300 m/s. The permanent rotor shaft assembly 200 comprises a permanent magnet cylindrical core 201 having a longitudinal axis X-X'. The cylindrical core 201 is axially compressed by first and second end shafts 202A, 202B and is radially compressed by a sleeve 204 made of a non-magnetic high strength metal. The set of elements 201, 202A and 202B forms the overall rotor shaft in a manner similar to the overall rotor shaft of the assembly 100 of the first embodiment.

However in the permanent rotor shaft assembly 200 according to the second embodiment of FIGS. 2 and 3, a central shoulder head 203A, 203B is provided in each of the first and second end shafts 202A, 202B, in its portion facing the cylindrical core 201, a mating central recess 206A, 206B is provided in each of the central portions of the front faces of the cylindrical core 201, and the central shoulder heads 203A, 203B are respectively mounted in the mating central recesses 206A, 206B. Such arrangement of the second embodiment is otherwise similar to the first embodiment and the same materials, assembly means and optional features such as the additional tracks or stack iron laminations 105A, 105B of FIG. 1 may also be applied to the embodiment of FIG. 2. The assembly 200 of FIG. 2 nevertheless constitutes a best mode of implementation of the invention and ensures an easy concentric alignment of the elements 202A, 201, 202B, whilst inserting the sleeve 204 and confers an enhanced stiffness on the set of elements once assembled.

The invention further relates to a method for making a permanent rotor shaft assembly 100 or 200 for an electrical machine, comprising the steps of:

forming a permanent magnet cylindrical core 101 respectively 201 having a longitudinal axis X-X', bonding a first end shaft 102A respectively 202A onto one end of the permanent magnet cylindrical core 101 respectively 201, bonding a second end shaft 102B respectively 202B onto the other end of the permanent magnet cylindrical core 101 respectively 201, installing a sleeve 104 respectively 204 made of a non-magnetic high strength metal in interference fit fashion around the permanent magnet cylindrical core 101 respectively 201 and the portions of the first and second end shafts 102A, 102B respectively 202A, 202B adjacent to the permanent magnet cylindrical core 101 respectively 201, so that the cylindrical core 101 respectively 201 be axially compressed by the first and second end shafts 102A, 102B respectively 202A, 202B and be radially compressed by the sleeve 104 respectively 204.

More specifically, the method according to the invention further comprises the steps of:

providing at least one central shoulder head 103A respectively 203A, 203B in the first and second end shafts 102A, 102B respectively 202A, 202B, in its portion facing the cylindrical core 101 respectively 201, providing in a central portion of a front face of the cylindrical core 101 respectively 201, at least one mating central recess 106A respectively 206A, 206B, which is adapted to cooperate with the at least one central shoulder head 103A respectively 203A, 203B, and mounting the at least one central shoulder head 103A respectively 203A, 203B in the at least one mating central recess 106A respectively 206A, 206B, before inserting the sleeve 104 respectively 204 made of a non-magnetic high strength metal in interference fit fashion around the permanent magnet cylindrical core 101 respectively 201 and the portions of the first and second end shafts 102A, 102B respectively 202A, 202B adjacent to the permanent magnet cylindrical core 101 respectively 201.

In the preferred embodiment illustrated in FIGS. 2 and 3, a central shoulder head 203A, 203B is provided in each of the first and second end shafts 202A, 202B, in its portion facing the cylindrical core 201, a mating central recess 206A, 206B is provided in each of the central portions of the front faces of the cylindrical core 201, and the central shoulder heads 203A, 203B are respectively mounted in the mating central recesses 206A, 206B, before inserting the sleeve 204 made of a non-magnetic high strength metal in interference fit fashion around the permanent magnet cylindrical core 201 and the portions of the first and second end shafts 202A, 202B adjacent to the permanent magnet cylindrical core 201.

The central shoulder head 103A, 203A or 203B is inserted in a corresponding mating central recess 106A, 206A or 206B preferably by tight fit assembly, slip joint assembly or glued assembly.

The first and second end shafts 102A, 102B respectively 202A, 202B and the sleeve 104 respectively 204 are preferably fixed to the permanent magnet cylindrical core 101 respectively 201 by welding, adhesive or heat shrinking.

Generally speaking, the invention provides a simplification in the manufacturing process, increases performance and reduces cost.

Although preferred embodiments have been shown and described, it should be understood that any changes and modifications may be made therein without departing from the scope of the invention as defined in the appended claims. Thus the features of the different embodiments may be combined. In particular the stepped portions 122A, 122B and the cylindrical tracks or stack laminations 105A, 105B of the embodiment of FIG. 1 may be implemented in the embodiment of FIGS. 2 and 3.

The invention claimed is:

1. A permanent rotor shaft assembly for an electrical machine, comprising:
   a permanent magnet cylindrical core having a longitudinal axis, the cylindrical core being axially compressed by a first end shaft and a second end shaft and the cylindrical core, the first end shaft and the second end shaft collectively being radially compressed by a sleeve made of a non-magnetic, high strength metal,
   a central shoulder head extending axially from a portion of at least one of the first end shaft and the second end shaft facing the cylindrical core, the central shoulder head being centrally located, having a constant annular diameter through the axial direction and smaller than the portion of the at least one of the first end shaft and the second end shaft facing the cylindrical core, the central shoulder head having a shape and size concentrically aligning the first end shaft and the second end shaft with the permanent magnet cylindrical core while inserting the sleeve,
   wherein the central shoulder head cooperates with a mating central recess made in a central portion of a front face of the cylindrical core.

2. The permanent rotor shaft assembly according to claim 1, wherein the permanent magnet cylindrical core comprises rare earth magnets made of one of NdFeBr and Sm2Co17.

3. The permanent rotor shaft assembly according to claim 1 or claim 2, wherein the sleeve is made of a non-magnetic high strength metal chosen among Inconel, Hastelloy, Ti-6% Al-6% V-2% Sn, Ti-2.5% Cu.

4. The permanent rotor shaft assembly according to claim 1, wherein the central shoulder head is inserted in the mating central recess by one of tight fit, slip joint and glued assembly.

5. The permanent rotor shaft assembly according to claim 1, wherein the first end shaft and the second end shaft and the sleeve are fixed on the permanent magnet cylindrical core by welding, adhesive or heat shrinking.

6. The permanent rotor shaft assembly according to claim 1, wherein the first end shaft and the second end shaft further comprise cylindrical tracks for mechanical bearings.

7. The permanent rotor shaft assembly according to claim 6, wherein the cylindrical tracks for mechanical bearings are located on a stepped portion of the first end shaft and the second end shaft.

8. The permanent rotor shaft assembly according to claim 1, wherein the first end shaft and the second end shaft further comprise cylindrical stack iron laminations for magnetic bearings.

9. The permanent rotor shaft assembly according to claim 8, wherein the cylindrical stack iron laminations for magnetic bearings are located on a stepped portion of the first end shaft and the second end shaft.

10. The permanent rotor shaft assembly according to claim 1, wherein a central shoulder head is provided in each of the first end shaft and the second end shaft and facing the cylindrical core, a mating central recess is provided in each of the central portions of the front faces of the cylindrical core, and the central shoulder heads are respectively mounted in the mating central recesses.

11. A rotary high speed electrical machine having tip speeds up to 300 m/s, comprising:
a permanent rotor shaft assembly having a permanent magnet cylindrical core having a longitudinal axis, the cylindrical core being axially compressed by first end shaft and the second end shaft and the cylindrical core, the first end shaft and the second end shaft collectively being radially compressed by a sleeve made of a non-magnetic, high strength metal being radially compressed by a sleeve made of a non-magnetic, high strength metal,
a central shoulder head extending axially from a portion of at least one of the first end shaft and the second end shaft facing the cylindrical core, the central shoulder head being centrally located having a constant annular diameter through the axial direction, and smaller than the portion of the at least one of the first end shaft and the second end shaft facing the cylindrical core, the central shoulder head having a shape and size concentrically aligning the first end shaft and the second end shaft with the permanent magnet cylindrical core while inserting the sleeve,
wherein the central shoulder head cooperates with a mating central recess made in a central portion of a front face of the cylindrical core.

12. A method for making a permanent rotor shaft assembly for an electrical machine, comprising the steps of:
forming a permanent magnet cylindrical core having a longitudinal axis;
bonding a first end shaft onto one end of the permanent magnet cylindrical core;
bonding a second end shaft onto the other end of the permanent magnet cylindrical core;
installing a sleeve made of a non-magnetic high strength metal in interference fit fashion around the permanent magnet cylindrical core and the portions of the first end shaft and the second end shaft adjacent to the permanent magnet cylindrical core, so that the cylindrical core be axially compressed by the first end shaft and the second end shaft and the cylindrical core, the first end shaft and the second end shaft collectively be radially compressed by the sleeve, and wherein the method further includes;
providing at least one central shoulder head extending axially from a portion of at least one of the first end shaft and the second end shaft facing the cylindrical core, the central shoulder head being centrally located, having a constant annular diameter through the axial direction, and smaller than the portion of the at least one of the first end shaft and the second end shaft facing the cylindrical core, the central shoulder head having a shape and size concentrically aligning the first end shaft and the second end shaft with the permanent magnet cylindrical core while inserting the sleeve;
providing in a central portion of a front face of the cylindrical core, at least one mating central recess, which is adapted to cooperate with the at least one central shoulder head; and
mounting the at least one central shoulder head in the at least one mating central recess, before inserting the sleeve made of a non-magnetic high strength metal in interference fit fashion around the permanent magnet cylindrical core and the portions of the first end shaft and the second end shaft adjacent to the permanent magnet cylindrical core.

13. The method according to claim 12, wherein a central shoulder head is provided in each of the first end shaft and the second end shaft, in its portion facing the cylindrical core, a mating central recess is provided in each of the central portions of the front faces of the cylindrical core, and the central shoulder heads are respectively mounted in the mating central recesses, before inserting the sleeve made of a non-magnetic high strength metal in interference fit fashion around the permanent magnet cylindrical core and the portions of the first end shaft and the second end shaft adjacent to the permanent magnet cylindrical core.

14. The method according to claim 12, wherein the central shoulder head is inserted in a mating central recess by tight fit assembly, slip joint assembly or glued assembly.

15. The method according to claim 12, wherein the first end shaft and the second end shaft and the sleeve are fixed to the permanent magnet cylindrical core by one of welding, adhesive or heat shrinking.

* * * * *